United States Patent
Noureddine et al.

(10) Patent No.: US 9,413,695 B1
(45) Date of Patent: Aug. 9, 2016

(54) MULTI-FUNCTION INTERCONNECT HAVING A PLURALITY OF SWITCH BUILDING BLOCKS

(71) Applicant: Chelsio Communications, Inc., Sunnyvale, CA (US)

(72) Inventors: Wael Noureddine, Mountain View, CA (US); Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 692 days.

(21) Appl. No.: 13/622,288

(22) Filed: Sep. 18, 2012

(51) Int. Cl.
  *H04L 12/50* (2006.01)
  *H04L 12/935* (2013.01)

(52) U.S. Cl.
  CPC .................................. *H04L 49/309* (2013.01)

(58) Field of Classification Search
  None
  See application file for complete search history.

(56) References Cited

U.S. PATENT DOCUMENTS

| | | | | |
|---|---|---|---|---|
| 5,790,553 | A * | 8/1998 | Deaton, Jr. | H04L 29/06 370/466 |
| 6,578,086 | B1 * | 6/2003 | Regan | H04L 12/462 370/254 |
| 6,757,725 | B1 * | 6/2004 | Frantz | H04L 12/24 370/200 |
| 7,760,733 | B1 | 7/2010 | Eiriksson et al. | |
| 8,054,832 | B1 | 11/2011 | Shukla et al. | |
| 2003/0200315 | A1 | 10/2003 | Goldenberg et al. | |
| 2004/0172485 | A1 | 9/2004 | Naghshineh et al. | |
| 2007/0036178 | A1 * | 2/2007 | Hares | H04L 45/00 370/490 |
| 2008/0133709 | A1 * | 6/2008 | Aloni | G06F 13/102 709/218 |
| 2010/0020814 | A1 * | 1/2010 | Thyni | H04L 12/4625 370/412 |
| 2010/0214950 | A1 * | 8/2010 | Vobbilisetty | H04L 45/02 370/254 |
| 2010/0312941 | A1 | 12/2010 | Aloni et al. | |
| 2011/0087774 | A1 | 4/2011 | Pope et al. | |
| 2011/0090915 | A1 | 4/2011 | Droux et al. | |
| 2011/0149966 | A1 | 6/2011 | Pope et al. | |
| 2011/0299543 | A1 | 12/2011 | Diab et al. | |
| 2012/0016970 | A1 * | 1/2012 | Shah | G06F 9/45558 709/220 |
| 2012/0117366 | A1 * | 5/2012 | Luo | G06F 13/385 713/2 |

(Continued)

OTHER PUBLICATIONS http://www.ieee802.org/1/files/public/docs2009/new-hudson-vepa_seminar-20090514d.pdf; C. Hudson and P. Congdon, Edge Virtual Bridging with VEB and VEPA, May 14, 2009.
U.S. Appl. No. 13/330,513, filed Dec. 19, 2011.

(Continued)

*Primary Examiner* — Kwang B Yao
*Assistant Examiner* — Hardikkumar Patel
(74) *Attorney, Agent, or Firm* — Beyer Law Group LLP

(57) ABSTRACT

A multi-port L2 to L7 switch may be implemented using multi-port switch building blocks such as a multi-port intelligent network interface card (NIC), without necessitating a dedicated switch. It is, for example, possible to build a 16-node switched interconnect from 16 4-port building blocks. Such a multi-port L2 to L7 switch may be used as a storage/compute cluster interconnect, where it replaces one or more external switches. The multi-port switch may utilize routing protocols such as IS-IS and OSPF. It may further support ACL, TCP proxy (L4 switching), iSCSI switching (L7 switching), and multi-function gateway capability, translating between different protocols such as iSCSI/FCoE/FC/SAS, etc.

24 Claims, 5 Drawing Sheets

(56) References Cited

U.S. PATENT DOCUMENTS

| | | |
|---|---|---|
| 2012/0151004 A1 | 6/2012 | Pope |
| 2012/0155256 A1 | 6/2012 | Pope et al. |
| 2012/0170585 A1* | 7/2012 | Mehra .................... H04L 45/24 370/400 |
| 2013/0022045 A1* | 1/2013 | An ........................ H04L 45/025 370/392 |
| 2013/0080567 A1 | 3/2013 | Pope |
| 2013/0195111 A1* | 8/2013 | Allan .................... H04L 12/462 370/395.53 |
| 2014/0310405 A1 | 10/2014 | Pope et al. |

OTHER PUBLICATIONS

Office Action in U.S. Appl. No. 13/330,513, dated Sep. 12, 2013.
Final Office Action in U.S. Appl. No. 13/330,513, dated Apr. 11, 2014.
Advisory Action in U.S. Appl. No. 13/330,513, dated Jul. 8, 2014.
Office Action in U.S. Appl. No. 13/330,513, dated Apr. 8, 2015.
Office Action in U.S. Appl. No. 13/330,513, dated Oct. 14, 2015.

* cited by examiner

MULTI-FUNCTION INTERCONNECT HAVING A PLURALITY OF SWITCH BUILDING BLOCKS

FIELD OF THE INVENTION

The present invention is in the field of multi-function network switches and switched networking fabrics.

SUMMARY OF THE INVENTION

A method and apparatus allowing the interconnection of host systems using the switching capability of a multi-port intelligent network interface card. Distributed or centralized control plane implementations are possible, including software defined network control.

DETAILED DESCRIPTION

Network topologies typically consist of "sub-networks" of end-stations/host systems connected through layer 2 switches, that are in turn interconnected with layer 3 switches or (edge) routers into larger networks. Edge routers or gateways may bridge between different network technologies such as Ethernet and SDH.

The inventors have realized that a L2 to L7 network may be implemented using a multi-port switch building block consisting of a multi-port intelligent network interface card (NIC), without necessitating a dedicated switch. It is for example, possible to build a 16-node switched interconnect from 16 4-port building blocks. Such a multi-port L2 to L7 switch may be used as a storage/compute cluster interconnect, where it replaces one or more external switches. The multi-port switch may utilize routing protocols such as IS-IS or OSPF for packet delivery. It may further support ACL, TCP proxy (L4 switching), iSCSI switching (L7 switching), and multi-function gateway capability, translating between different protocols such as iSCSI/FCoE/FC/SAS, etc.

Figure 1:
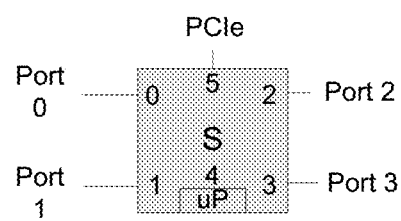
FIG. 1 illustrates an example of a multi-port switch building block (SW) as a 4-port Ethernet switch with the 5-th port being and embedded control μP and the 6th port being a host bus interface (e.g., PCIe).

For example, a multi-port switch building block may have four 1GE/10GE ports, a PCIe interface bus, an integrated control processor (uP) and an additional 1GE NCSI management interface. FIG. 1 illustrates an example of a multi-port switch building block as a 4-port Ethernet switch with the 5-th port being the integrated μP and the 6th port being the PCIe interface, connected to the host system bus. In FIG. 1, the NCSI management interface (port 7) is not shown.

The example FIG. 1 multi-port switch building block has the capabilities usable to implement a Layer-2 switch: the building block can switch from any of the 4 Ethernet ports to any of the 4 Ethernet ports, the embedded μP, the NCSI interface, or the PCIe bus (host). Furthermore the multi-port switch building block is capable of operating routing protocols such as IS-IS in the embedded μP, which can be used to enable multi-path communication in a fabric that is assembled from multi-port switch building blocks, without necessitating standalone switches.

Alternatively, a centralized control model may be used to collect network state from the participating nodes, and determine appropriate routes for traffic between all pairs of nodes, e.g. by running a shortest path first (SPF) algorithm (which may support multi-path routing), as well as a suitable algorithm for multicast/broadcast packet delivery. A central control point may utilize a protocol such as OpenFlow to exchange state with and configure the building block nodes.

As a result of operating a routing protocol, or based on central control determination, the packet processing functionality of the building block is configured to switch ingress and egress packets to the appropriate port.

The example FIG. 1 multi-port switch building block may have additional L3, L4, and L7 switching capabilities. The L3 routing capabilities may include Ethernet Destination Address (DA), Source Address (SA), Virtual LAN Identifier (VLAN) rewrites based on classification of the e.g. IP/TCP/UDP headers. The L4 capability may include switching/proxy based on TCP and UDP header fields, optionally in combination with IP header fields. Finally the L7 switching capability may include switching based on L7 information such as upper layer (iSCSI and iWARP) or application level header and payload information.

The example FIG. 1 multi-port switch building block Ethernet port to Ethernet port switching latency may be less than 1 μs. The example FIG. 1 multi-port switch building block Ethernet port ingress bandwidth may be an aggregate of 28 Gbps across the 4 Ethernet ports, and the egress bandwidth may be an aggregate of 28 Gbps across the 4 Ethernet ports. In another example, the bandwidth may be line rate for 4 10 Gbps ports.

Figure 2:
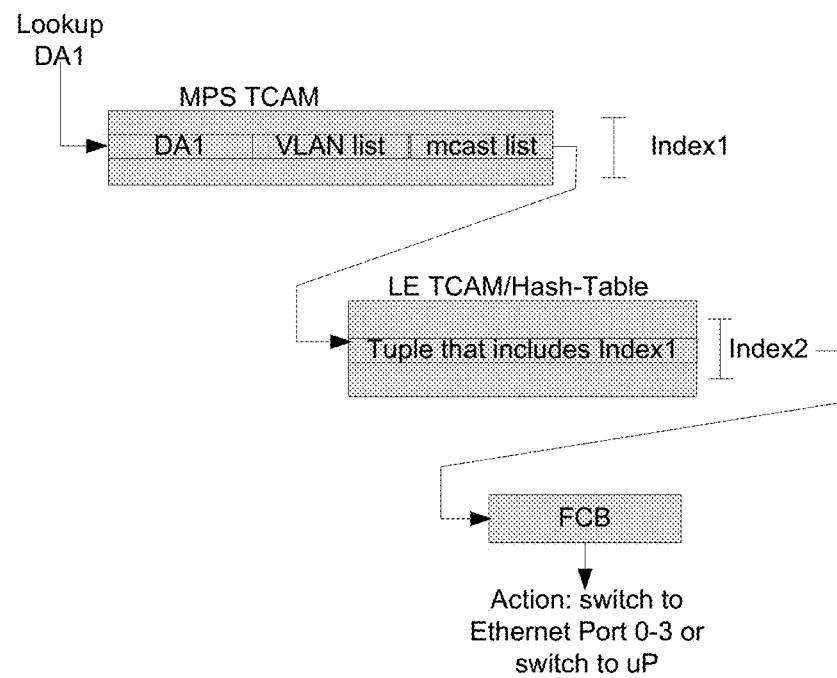
FIG. 2 illustrates an example of functionality within a switch building block to accomplish unicast switching.

FIG. 2 illustrates an example of unicast switching using a multi-port switch building block. The unicast switching of a packet with Ethernet address DA1, arriving on one of the 4 Ethernet ports 0-3 and leaving on the same Ethernet port (hairpin turn), or leaving on a different Ethernet port, or to the uP may be accomplished by populating a lookup TCAM referred to as the MPS TCAM with the DA1 entry, by populating a second TCAM or hash table referred to as the LE table, with a filter entry that contains the index of the DA1 Index1 in the MPS TCAM as part of the tuple, and finally is accomplished by creating a rule FCB (Filter Control Block) that specifies the switching and rewrite action i.e. to which Ethernet port the Ethernet frame is to be switched.

In some examples, the switch is configured for rewriting of DA, SA, and VLAN; and in some examples, the switch is also configured for rewriting of FIP, LIP, FP, LP or other fields of the network stack headers. Relevant TCAM functionality is described, for example, in U.S. Pat. No. 7,760,733 and U.S. Pat. No. 7,616,563, each of which is incorporated by reference herein in its entirety.

An MPS TCAM entry can optionally contain a list of VLANs that are allowed for the particular DA, and an entry can also contain information on which port(s) packets with the particular DA are allowed to arrive on. The multicast list is described in the next subsection and is used to accomplish multicast and broadcast switching action.

The LE tuple can optionally contain IP header fields (L3 information) e.g. LIP (Local IP address) and/or FIP (Foreign IP address), Protocol Number, TOS/DSCP value, TCP/UDP header fields (L4 information) e.g. LP (Local Port number) and/or FP (Foreign Port number), and it can contain parts of the e.g. TCP payload and/or UDP payload and/or other payload (L7 information). When the tuple contains only DA index information the switching is pure L2 switching, when in addition it contains L3 information the switching is L3 switching aka routing, and when it contains parts of the payload the switching is L7 switching. The TCAM can contain don't care information that enables simultaneous L2, L3, L4, and L7 switching for different Ethernet frames. The FCB actions can also include dropping a packet matching the filter entry and the switch may therefore implement Access Control Lists (ACL) and firewall functionality for incoming packets.

The FCB Action can also include re-writing of the header fields such as DA, SA (or swapping of the DA and SA), VLAN as well as removing the VLAN tag, or inserting a VLAN (or other) tag. The FCB/TCB can also include offload of TCP packets and the full TCP proxy connection (payload transfer) of two TCP connections.

In addition, the µP may be useful as the destination for control plane packets, for example for a configuration protocol to configure each of the MPS TCAM, LE TCAM/hash and FCB in a fabric of "S" switch building blocks. For this purpose, the MPS TCAM, the LE table, and the FCB can be initialized with an entry that switches all incoming Ethernet frames with a particular DA-µP to the local µP. That µP in turn can send a configuration packet to each of the 4 nearest neighbors, etc.

The multi-port switch building block may implement multicast and broadcast by using the mcast-list bit-mask in the MPS TCAM. In the example above, a frame with destination address DA1 is replicated for each bit set in the mcast-list bit-mask and a frame copy is sent through the LE table and FCB and the associated replication index, and this in turn enables different switching and re-writing actions for each of the different copies of the frame created with multicast. Examples of this will be described later, when it is shown how the multi-port switch building block implements flooding, the sending of a copy of frame to each of the output ports.

Figure 3:
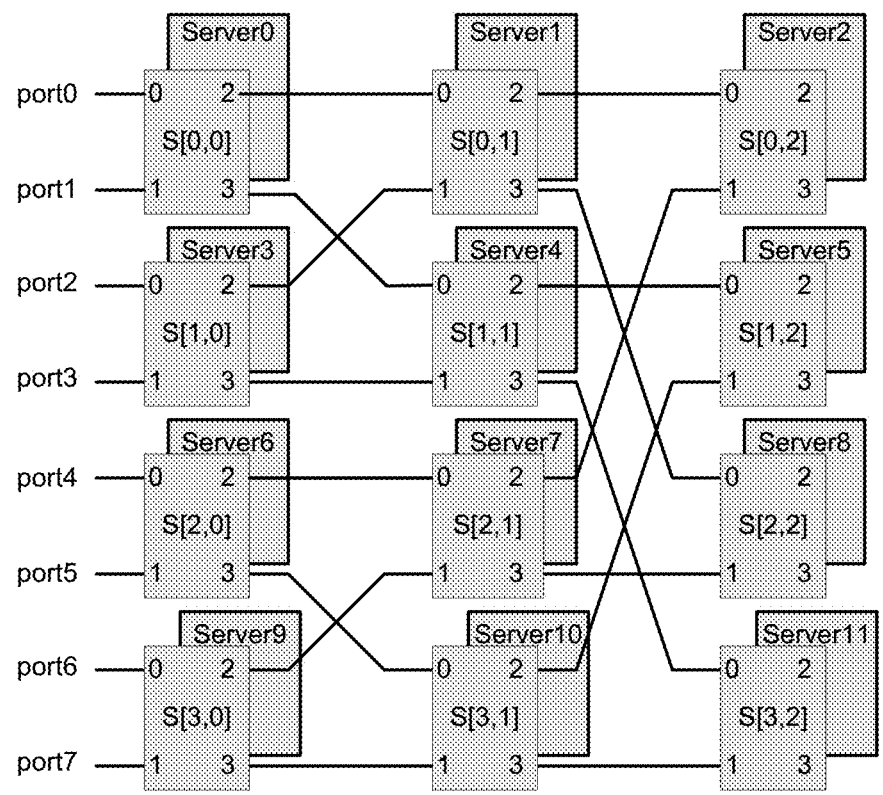
FIG. 3 illustrates an example of a 12 node server cluster connected with an 8-port butterfly switch.

FIG. 3 illustrates an example of a 12 node server cluster connected with an 8-port butterfly switch. In particular, the server cluster includes 8 10GE uplink ports, where the servers are connected to the S via the PCIe interface and where the S are connected using the butterfly switch topology.

The following table summarizes some example features of the 12 node cluster:

| Cost of external switch | $0 |
| Power of external switch | 0 W |
| Minimum port to port latency | 1 × 1 usec = 1 usec |
| Maximum port to port latency | 5 × 1 usec = 5 usec |
| Aggregate Uplink Bandwidth | 64 Gbps |

The 8-port butterfly switch may be implemented as follows. The multi-port switch building blocks have 4×10 Gbps Ethernet ports, the capability to switch between each of the 4-ports at line rate, and each of the S have a 512 entry Ethernet Address (DA) MPS TCAM, and 2K LE ternary filter/forwarding rules with up to 1 M standard lookup rules. Each of the DA TCAM entries has a list of allowable arrival ports, and a list of up to 16 allowed VLAN tags associated with each DA.

At a high level, the switch operates by associating each of the DA MPS TCAM entries with a filtering/forwarding rule, and DA TCAM and the filtering/forwarding rule are in combination used to allow an Ethernet frame with a particular DA to arrive on a particular S port and is used to forward/switch an incoming Ethernet frame to an output port. It is possible to add which ports packets from DA=DA1 are allowed to arrive, and for S[0,0] this includes all ports except port 3, e.g. port 0,1,2 are legal arrival ports, and the DA TCAM can be programmed to drop any frames that arrive on other ports, i.e. port 3.

Figure 4:
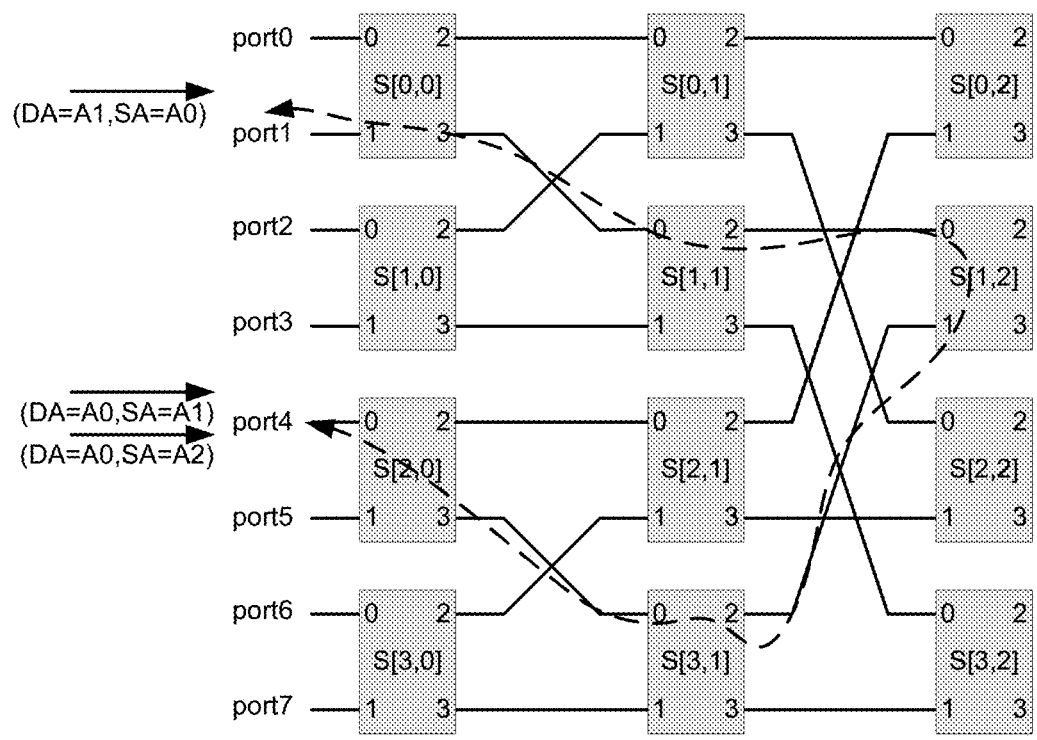
FIG. 4 illustrates an example 8-port butterfly switch arrangement and the path taken for an Ethernet packet with DA=A1 and SA=A0 from port1 to port4, and also shows the reverse path taken for an Ethernet packet with DA=A0 and SA=A1 from port4 to port1.

FIG. 4 illustrates an example 8-port butterfly switch arrangement and the path taken for an Ethernet packet with DA=A1 and SA=A0 from port1 to port4, and also shows the reverse path taken for an Ethernet packet with DA=A0 and SA=A1 from port4 to port1.

The example design uses 12 switch elements which could be pruned to 8 because the right most column of S[*,2] can be replaced by direct connections. The purpose of showing the complete diagram is to give an idea of how the design may be scaled to a larger number of ports. It is also noted that there are multiple paths available between some ports e.g. it is possible to switch from SW[0,0] to SW[1,0] either through SW[0,1] or SW[1,1].

The following TCAM table example describes how the MPS TCAM, the LE table and the FCB is configured for the switching of packets with destination and source addresses A1 and A2 between ports 1 and 4.

| S Instance | DA |
|---|---|
| S[0,0] | A1 |
| S[0,0] | A0 |
| S[1,1] | A1 |
| S[1,1] | A0 |
| S[1,2] | A1 |
| S[1,2] | A0 |
| S[3,1] | A1 |
| S[3,1] | A0 |
| S[2,0] | A1 |
| S[2,0] | A0 |

The filter table shows how the filter/forwarding rules may be set up in the different SW instances to forward the frames correctly to the different ports of the SW instance.

| S instance | DA | Forward to Port |
|---|---|---|
| S[0,0] | A1 | 3 |
| S[0,0] | A0 | 1 |
| S[1,1] | A1 | 2 |
| S[1,1] | A0 | 0 |
| S[1,2] | A1 | 1 |
| S[1,2] | A0 | 0 |
| S[3,1] | A1 | 0 |
| S[3,1] | A0 | 2 |
| S[2,0] | A1 | 0 |
| S[2,0] | A0 | 3 |

We now describe examples of flooding in the SW 4-port switch building block. Flooding a packet that arrives on one of the 4-ports of the switch building block involves sending a copy of the packet to all the other 3 ports of the building block. The hardware multicasting capability of the SW switch building block can be used to flood the other ports when the DA lookup doesn't produce a hit, i.e. when the forwarding rule for an Ethernet address is not known.

Flooding uses a default flooding entry in the last entry in the DA MPS TCAM with don't care values for the address and replicating it to 4 VI (Virtual Interfaces) and using 16 LE filter/forwarding-rules to flood the packet to the other ports besides the port the packet arrived on. The packet can also optionally be flooded to the uP and the PCIe bus.

The table shows an example configuration where the first 4 (optionally 6) VI are used to flood a frame.

| Arrival Port | VI | Forward to Port | Comments |
|---|---|---|---|
| 0 | 0 | DROP | |
| 0 | 1 | 1 | |
| 0 | 2 | 2 | |
| 0 | 3 | 3 | |
| 0 | 4 | uP | optional |
| 0 | 5 | PCIe | optional |
| 1 | 0 | 0 | |
| 1 | 1 | DROP | |
| 1 | 2 | 2 | |
| 1 | 3 | 3 | |
| 1 | 4 | uP | |
| 1 | 5 | PCIe | optional |
| 2 | 0 | 0 | |
| 2 | 1 | 1 | |
| 2 | 2 | DROP | |
| 2 | 3 | 3 | |
| 2 | 4 | uP | |
| 2 | 5 | PCIe | optional |
| 3 | 0 | 0 | |
| 3 | 1 | 1 | |
| 3 | 2 | 2 | |
| 3 | 3 | DROP | |
| 3 | 4 | uP | |
| 3 | 5 | PCIe | optional |

The example uses the DROP rule to drop the inbound frame because the MPS TCAM does not use the port number as part of the lookup key, but instead looks up the allowed ports for a DA after producing a hit in the TCAM.

There are cases where all the Ethernet ports of a building block instance are not in use: either the port is not connected/active or the port doesn't forward any packets between a pair of ports. In these cases there are no flooding entries between two such ports.

A switch can learn forwarding rules through several mechanisms, for example:

From the {VLAN,SA,Port} of received frames
Via Layer-2 Registration protocols
By manual configuration, such as by an administrator programming the forwarding rules via configuration scripts
Through programming filters to snoop protocol traffic such as ARP and DHCP
Through operating a link state protocol either in a distributed fashion or in a centralized control point (CP). A centralized control point can gather the link state of the interconnect and compute forwarding rules, which in turn are programmed in the building blocks. In the central control point case, packet flooding may not required since the CP can explicitly build a complete view of the location of all addresses.

For example, learning via layer-2 registration protocols may be via reserving an Ethernet broadcast address for a configuration protocol and creating forwarding/flooding rules in each building block where one of the entries forwards a copy of the frame to the uP that uses the payload of the frame to program the forwarding rules. Each of the building blocks can use the NCSI interface to implement e.g. a fabric management plane. The learning can also happen as part of operating a common protocol, such as gratuitous ARP.

Figure 5:
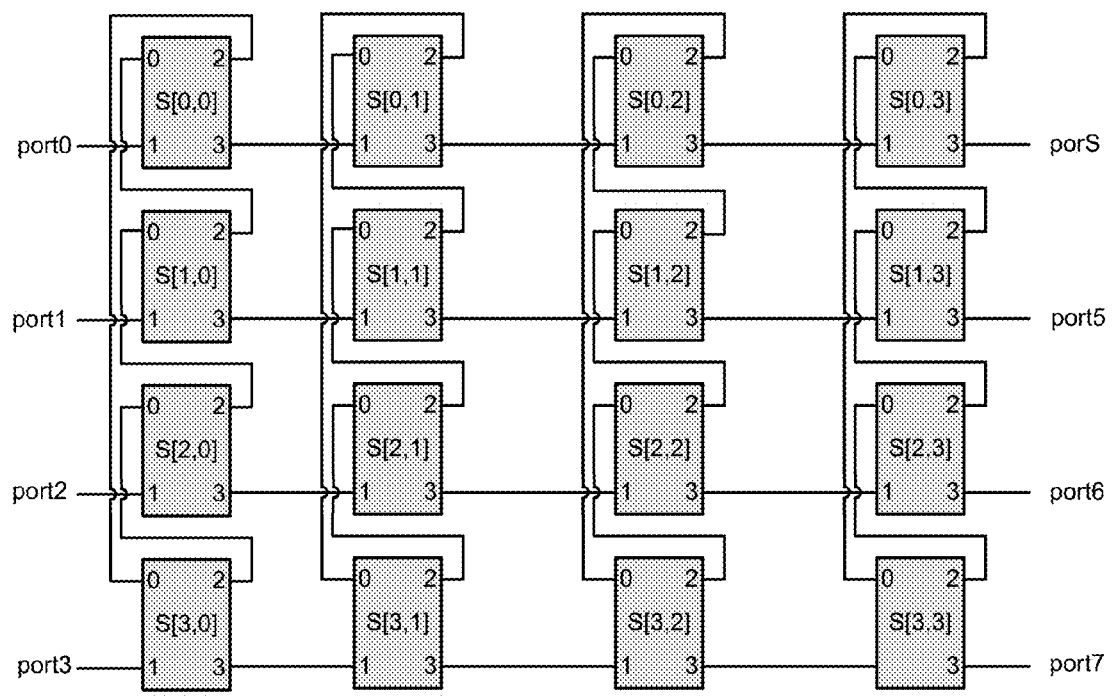
FIG. 5 illustrates an example grid arrangement of switching blocks. The FIG. 5 topology allows a symmetric network to be created using a number of SW-equipped servers. Other popular topologies can be constructed, such as multi-dimensional torus arrangements.

FIG. 5 illustrates an example grid arrangement of switching blocks. The FIG. 5 topology allows a symmetric network to be created using a number of SW-equipped servers, in this case a network of 16 such servers. It is possible to make efficient use of the interconnect by running a suitable link discovery and routing protocol that is capable of multi-path computation instead of the standard Ethernet Spanning Tree Protocol and Learning/Forwarding operation.

For example, an OSPF or IS-IS like protocol can be implemented to exchange the addressed (replacing IP addresses with MAC addresses) of the participating nodes, and to construct the topology of the network using flooding of link state advertisement (LSA) messages. Once the topology is discovered a multi-path Shortest Path First algorithm such as Dijkstra's can be used to determine routes to all the nodes in the network. The computed routes are then used to program a filter rule per destination node.

Multicast and broadcast delivery trees can be determined by running a similar algorithm per multicast group. The computed trees are then used to program a filter rule per multicast address at each node.

Furthermore, in order to provide connectivity outside of the grid, gateway nodes with connectivity to the "outside world" can be identified during the network discovery phase. Default filter rules can then be programmed to send traffic to unknown addressed towards these nodes, which in turn program their default rules to send out the unmatched packets on the ports connected to the outside.

We now discuss a process for L2 learning. An L2 learning process learns an SA=SA0 from a received packet from port=i, e.g. it would look up SA0 in the MPS TCAM and if it doesn't product a hit, then it would learn to forward DA=SA0 to port=i. The SW switch building block can be enhanced to look up SA and DA separately and perform two actions, i.e. learn SA if necessary, and in addition forward DA.

The SW learns an SA0 when a lookup does not produce a hit, and the SW floods a DA0 when it does not produce a hit in the MPS TCAM.

The learning process is the following: Frame (DA=DA0, SA=SA0) arrives on some port
If(SA0 lookup in DA TCAM produces a hit on a don't care entry)
  then begin
    create a DA TCAM entry that indicates that DA=SA0 goes
      to the source port of the current frame
  end
if(DA0 lookup in DA TCAM produces a hit on a don't care entry)
  then begin
    create 4 copies of frame and use flooding filter rules to
      forward frame to other ports
  end We have thus described a multi-port L2 to L7 switch implemented using multi-port switch building blocks such as a multi-port intelligent network interface card (NIC), without necessitating a dedicated switch.

What is claimed is:

1. A multiport switch fabric, comprising:
  a plurality of network interface controller (NIC) building blocks, each NIC building block comprising:
    circuitry to receive data packets incoming from a network;
    at least two different port circuitry, one of the at least two different port circuitry configured as a host port to connect said each NIC building block to a corresponding host via a host bus; and
    destination selection circuitry, configured to determine to which of the at least two different port circuitry to provide data of the received data packets,
  wherein port circuitry of at least some of the plurality of NIC building blocks are provided a path to port circuitry of at least others of the plurality of NIC building blocks, and wherein the destination selection circuitry of the plurality of NIC building blocks are collectively configurable for the multiport switch fabric to achieve at least one desired switching function,
  whereby the at least one desired switching function is accomplished without necessitating a dedicated switch.

2. The multiport switch fabric of claim 1, wherein:
the destination selection circuitry determining to provide data of a received data packet to at least one output port of each NIC building block is according to at least one switching protocol and, further, according to information regarding at least one application executing on the corresponding host.

3. The multiport switch fabric of claim 2, wherein:
the information regarding at least one application executing on the corresponding host is layer 3 information indicating a connection between the at least one application and a peer via the network.

4. The multiport switch fabric of claim 3, wherein:
each NIC building block is further configured to selectively offload layer 3 protocol endpoint processing of the connection from the corresponding host.

5. The multiport switch fabric of claim 2, wherein:
at least one of the NIC building blocks is configured to not include connection to the corresponding host.

6. The multiport switch fabric of claim 5, wherein:
at least one of the NIC building blocks does not include host interface circuitry on a die of that NIC building block.

7. The multiport switch fabric of claim 1, wherein:
the receive circuitry of each NIC building block is configured to determine an action for each received data packet based on a portion of that packet; and
the destination selection circuitry of each NIC building block operates, for each received data packet, based on a determined action for that data packet.

8. The multiport switch fabric of claim 7, wherein the determined action includes rewriting a header portion of the received data packet.

9. The multiport switch fabric of claim 8, wherein:
rewriting a header portion of the received data packet includes at least one of:
  rewriting an Ethernet address according to at least one of a switching and routing rule; and
  rewriting Transmission Control Protocol and Internet Protocol header information according to a Layer 4 proxy rule.

10. The multiport switch fabric of claim 1, wherein:
the destination selection circuitry is configured to access a classification table based on a layer 2 destination address in the received packet, to determine a first index, and to access a lookup table based on the first index, to determine a second index, wherein the second index is used to determine the port circuitry.

11. The multiport switch fabric of claim 1, wherein:
the destination selection circuit is configured to operate according to a distributed routing protocol, including local delivery of the received packet to the corresponding host via the host bus, and wherein packets for which the distributed routing protocol cannot determine a destination, those packets are passed to the host for destination determination.

12. The multiport switch fabric of claim 1, wherein:
the destination selection circuitry is configured to run a control plane in a centralized fashion, exchanging link state information and programming replication, delivery and/or rewrite filter rules according to a control plane determination, and wherein packets for which the destination selection circuitry cannot determine a destination are passed to a central control point.

13. The multiport switch fabric of claim 1, wherein:
the destination selection circuitry is configured to operate in a gateway mode to translate between protocols based on centralized control.

14. The multiport switch fabric of claim 1, wherein:
the destination selection circuitry is further configured for access control.

15. The multiport switch fabric of claim 1, wherein:
link state information is communicated to a central control point; and
the destination selection circuitry is configured based on a determination made at the central control point.

16. The multiport switch fabric of claim 15, wherein:
a connection between the NIC building block on-board processor and a central control point is maintained to communicate link state information; and
a connection between the NIC building block on-board processor and a central control point is maintained to receive filtering rules.

17. The multiport switch fabric of claim 1, wherein:
the NIC building block operates packet replication circuitry.

18. The multiport switch fabric of claim 17, wherein:
the packet replication circuitry is configured based on a determination made at a central control point.

19. The multiport switch fabric of claim 18, wherein:
a connection is maintained with a central control point to communicate packet replication configuration.

20. An interconnect network, comprising:
a plurality of network interface controller building blocks, each network interface controller building block including:
  circuitry to receive data packets incoming from a network;
  at least two different port circuitry, one of the at least two different port circuitry configured as a host port to connect said each network interface controller building block to a corresponding host via a host bus; and
  destination selection circuitry, configured to determine to which of the at least two different port circuitry to provide data of the received data packets,
wherein the network interface controller building blocks are interconnected to accomplish a switched network interconnect fabric,
  wherein port circuitry of at least some of the plurality of network interface controller building blocks are provided a path to port circuitry of at least others of the plurality of network interface controller building blocks, and wherein the destination selection circuitry of the plurality of network interface controller building blocks are collectively configurable for the multiport switch fabric to achieve at least one desired switching function,
  whereby the at least one desired switching function is accomplished without necessitating a dedicated switch.

21. The interconnect network of claim 20, wherein:
the plurality of network interface controller building blocks are collectively configured to run a distributed forwarding algorithm.

22. The interconnect network of claim 20, wherein:
the plurality of network interface controller building blocks are collectively configured to run a forwarding algorithm on a central control point.

23. The interconnect network of claim 22, wherein:
the central control point is configured to exchange state with and configure the plurality of network interface controller building blocks.

24. The interconnect network of claim 22, wherein:
the central control point is configured to operate an OpenFlow protocol to exchange state with and configure the plurality of network interface controller building blocks.

\* \* \* \* \*